United States Patent [19]

Brennsteiner et al.

[11] Patent Number: 4,565,472
[45] Date of Patent: Jan. 21, 1986

[54] DRILL FOR HAND-HELD DRILLING DEVICES

[75] Inventors: Ernst Brennsteiner, Munich; Dieter Scholz, Unterpfaffenhofen, both of Fed. Rep. of Germany

[73] Assignee: Hilti Aktiengesellschaft, Schaan Fürstentum, Liechtenstein

[21] Appl. No.: 727,207

[22] Filed: Apr. 29, 1985

Related U.S. Application Data

[63] Continuation of Ser. No. 434,053, Oct. 13, 1982, abandoned.

[30] Foreign Application Priority Data

Nov. 11, 1981 [DE] Fed. Rep. of Germany ....... 3144826

[51] Int. Cl.[4] ..................... B23B 51/00; B23B 31/08; E21B 10/36
[52] U.S. Cl. .................................. 408/226; 175/414; 279/19; 279/19.5
[58] Field of Search ............... 408/226, 199; 173/132; 175/414, 415; 279/19.1, 19.2, 19.3, 19.4, 19.5, 19.6, 19.7, 19, 76, 77, 83, 84, 85

[56] References Cited

U.S. PATENT DOCUMENTS

| 2,047,125 | 7/1936 | Gartin | 279/19.3 |
| 2,853,973 | 9/1958 | Fish | 173/132 |
| 3,157,070 | 11/1964 | Heidrich | 173/132 |
| 3,202,433 | 8/1965 | Davis | 279/77 X |
| 3,811,694 | 5/1974 | Dahlman et al. | 279/83 |

FOREIGN PATENT DOCUMENTS

| 1222338 | 2/1971 | United Kingdom | 408/226 |
| 2100653 | 1/1983 | United Kingdom | 279/19.3 |
| 2103988 | 3/1983 | United Kingdom | 279/19.5 |
| 0737623 | 6/1980 | U.S.S.R. | 279/19.1 |
| 1048112 | 10/1983 | U.S.S.R. | 279/19.3 |

Primary Examiner—William R. Briggs
Attorney, Agent, or Firm—Toren, McGeady, Stanger, Goldberg & Kiel

[57] ABSTRACT

A drill is secured in percussion drilling machines and in tool holders of hammer drills by locking elements. The locking elements fit into axially extending grooves formed in the axially extending circumferential surface of the shank of the drill. Webs located intermediate the ends of the grooves divide the grooves into axially extending groove sections with the locking elements fitting into the groove sections. The outer surfaces of the webs are located in the circumferential surface of the shank and serve to support the jaws of the tool holder in the correct position.

10 Claims, 3 Drawing Figures

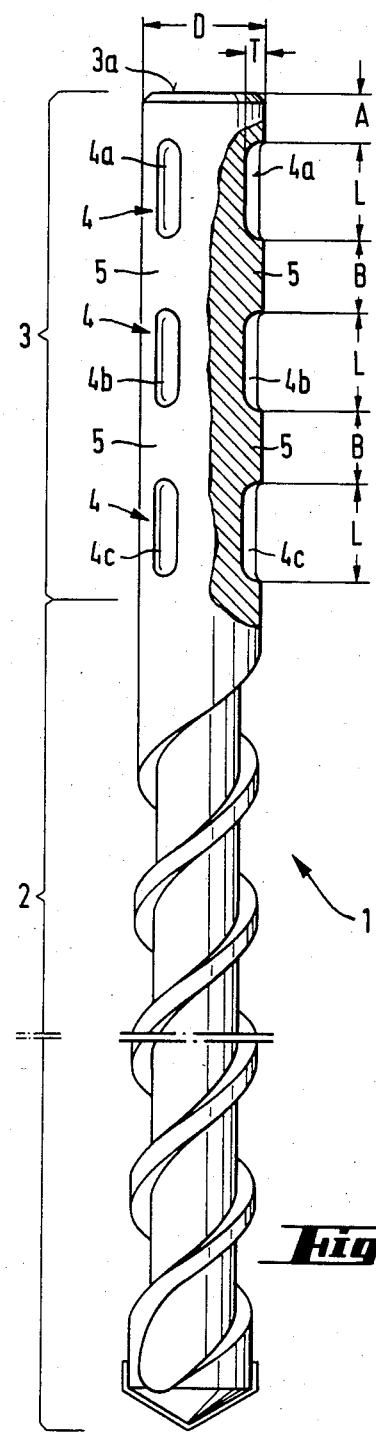
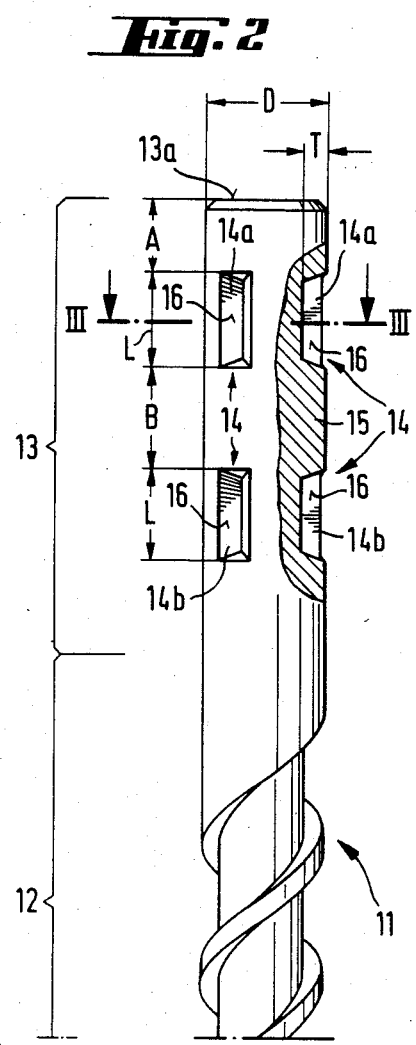
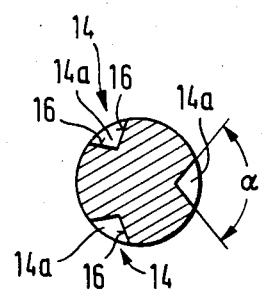
Fig. 1
Fig. 2
Fig. 3

DRILL FOR HAND-HELD DRILLING DEVICES

This is a continuation, of application Ser. No. 434,053, filed Oct. 13, 1982, abandoned.

SUMMARY OF THE INVENTION

The present invention is directed to a drill for use in hand-held drilling devices and the drill includes a shank with an axially extending closed ended groove.

Up to the present time percussion drilling machines and hammer drills have been used for cutting holes in hard materials, such as concrete, rock and the like. In these two types of drilling devices, the percussion drilling machines are more numerous because of their comparatively low manufacturing costs. An advantage of percussion drilling machines is that they use drills which have the same diameter for the shank end and the working or cutting end. Because of the use of the same diameter along its length, the drills can be produced economically and consequently are available at a reasonable price. The shanks of such drills are immovably secured in a chuck or holder which varies in diameter. Here the diameter-related favorable transfer torque to the drill is advantageous, because as the drill diameter increases so does the chuck distance. Therefore, it is possible to transfer a maximum of the output capacity of the percussion drilling machine to the drill.

In hammer drills, which are much more complicated structurally as compared to percussion drilling machines, due to a great extent because of other kinematic conditions, the hammer drills require a basically different type of mounting for the drill. In particular, with high kinematic energy transferred to the drill by the percussion action of the hammer drill, the tool holder in the hammer drill requires a certain axial mobility for the drill. Accordingly, different drills are used in hammer drills with the most widely used being those having a shank with axially extending closed ended grooves for engaging the locking elements of the tool holder.

The fundamental differences in the drill mounts used in percussion drilling machines and hammer drills conflicts with the economical need to use the drills in both types of devices. This need exists in all workshops which employ percussion drilling machines as well as hammer drills, because usually a larger number of drills of different diameters are stocked which can only be used in a particular drilling device. Accordingly, it is not possible to employ the known economical drills, used in percussion drilling means, in hammer drills by means of the locking element located in the tool holder. This is also true for the drills employed in hammer drills, because the grooves do not permit a centering engagement of the jaws of the tool holder. Usually, the drill assumes an inclined position relative to the axis of the tool holder with excessive wear resulting in both the drill and the tool holder.

Therefore, it is the primary object of the present invention to provide a drill which is economical to manufacture and is suitable for use in percussion drilling machines and hammer drills and advantageously utilizes the capacity of such devices.

In accordance with the present invention, axially extending grooves formed in the axially extending circumferential surface of the shank are divided by at least one web into axially extending groove sections. The outer surface of the web is located in the circumferential surface of the shank, that is, the web forms a continuation of the circumferential surface of the shank.

With this design of the shank it is possible to provide economical drills having the same diameter for the shank and the cutting end of the drill and the drill can be employed in both types of drilling devices. The location of the web adjoining the axially extending sections of the axially extending grooves affords adequate support for the jaws of the tool holder or chuck of a percussion drilling machine so that a properly aligned engagement of the drill in the percussion drilling machine is assured. With such a drill arrangement, minimal wear results along with a low-loss force transfer to the drill.

Based on the inventive arrangement of the shank, a support of the drill in hammer drills is guaranteed in conformance with the required capacity. The locking elements of the tool holder, corresponding to the number of axially extending groove sections, project into these sections for creating a secure support for the drill while allowing limited axial play. Basically it is possible to divide the axially extending grooves into more than two axially extending groove sections by providing two or more webs for dividing the groove. Such an arrangement is especially advantageous for drills with large dimensions which require an elongated guidance arrangement. To reduce wear and promote the transfer of force during hammer drill operation, it is advantageous if more than two locking elements project into the axially extending groove sections of the axially extending groove. The webs are usually formed by a remaining portion of the initial transverse cross-section of the shank located between the groove sections of the axially extending groove.

Advantageously, the space between the trailing end of the shank, that is, the end inserted into the tool holder, and the adjacent end of the longitudinal groove is 0.3 to 1 times the diameter of the shank. This construction defines the axial position of engagement of the jaws of the chuck or the locking elements of the tool holder. In particular when such a construction is used in hammer drills with locking elements extending normally relative to the axis of the tool holder, this spacing arrangement is advantageous to assure in advance that during each insertion of the drill into the tool holder that the locking elements enter into the axially extending groove sections. As an example, in a drill having a shank with a diameter 10 mm, the space between the trailing end face and the adjacent ends of the groove sections is 6 mm. Preferably, the axial length of the web is 0.4 to 1.1 times the diameter of the shank. A web of this axial length assures that short jaws of the tool holder which possibly only contact the surface of the shank in the area of the web are supported in their central axially extending section over an adequate area. As an example, for a shank with a diameter of 10 mm, the axial length of the web is 8 mm.

The length of each axially extending section of the axially extending groove corresponds advantageously to 0.7 to 1.7 times the diameter of the shank. Such a dimensional range assures an adequate axial length of the groove sections for engagement of the locking element capable of absorbing force and also guaranteeing that the jaw of a tool holder located in the range of such an axially extending groove section does not enter into the section but receives adequate support at the surface of the adjoining web or in the region of the shank free of the grooves. As an example, where the shank diameter is 10 mm, the length of an axially extending groove section is 8 mm.

Another dimensional feature of the invention has the maximum depth of the axially extending groove in the range of 0.1 to 0.3 times the diameter of the shank. Such a groove depth affords problem-free engagement of the locking elements while causing only a minimum reduction in the strength of the shank. Furthermore, such a maximum depth of the axially extending groove sections has the advantage that with the groove having a circular base, only relatively small areas of the cross-section of the shank are removed in forming the grooves.

For the effective rotary engagement of the drill the axially extending groove sections can be provided with a V-shaped transverse section. Similarly, the locking elements can also be constructed essentially wedge-shaped to conform to the sides of the groove sections. Because of the large surface interaction of the sides of the groove sections with the sides of the locking elements, minimum wear is assured. Relative to the ability to transfer force in such a shaped configuration of the groove sections, only a minimum loss in the transverse area of the shank is involved. Such a V-shaped configuration promotes the contact with the jaws of a tool holder.

While in a percussion drilling machine centering of the drill is effected by the jaws of the tool holder, in a hammer drill the centering action is effected by the axially extending grooves. In a V-shaped axially extending groove, it is possible to achieve centering of the drill by the interaction of the locking elements either with the groove base or the groove sides. In both types of centering, an angle defined by the sides of the axially extending groove sections in the range of 50° to 130° has proven to be most effective. For centering provided by the groove base, the angle is preferably somewhat larger, that is, it is in the upper part of the specified range, for instance, about 120°. Where centering is achieved by the sides of the groove sections, the angle defined between the sides is preferably in the range of 50° to 70° in view of the tangential forces which occur.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing

FIG. 1 is an elevational view, partly in section, illustrating a drill, embodying the present invention, and having three axially extending grooves each of which has a rounded base in transverse cross section;

FIG. 2 is a similar view of another embodiment of a drill incorporating the present invention where the axially extending grooves are V-shaped in transverse section; and FIG. 3 is a sectional view of the drill shown in FIG. 2 taken along the line III—III.

SUMMARY OF THE INVENTION

In FIG. 1 a drill 1 is illustrated made up of an axially extending working or cutting end 2 and an axially extending shank 3. The leading end of the drill is formed by the cutting end 2 and the trailing end by the shank 3. In the shank 3, three axially extending grooves 4 are spaced angularly apart around the circumferentially extending surface of the shank. The grooves 4 have a rounded or circular base. Each groove 4 is divided by a pair of axially spaced and axially extending webs 5 into three serially arranged axially extending groove sections 4a, 4b, 4c. The surface of the webs form a continuation of the circumferential surface of the shank 3.

The adjacent end of the axially extending groove 4 is spaced from the trailing end face 3a of the shank 3 by a distance A. The distance A corresponds to 0.4 times the diameter D of the shank. The axial length B of the web 5 is 0.6 times the diameter D of the shank. Each axially extending groove section 4a, 4b, 4c has the same length L and in the illustrated embodiment the length L is 0.8 times the diameter D of the shank 3. The maximum depth T of the axially extending groove sections 4a, 4b, 4c corresponds in the illustrated embodiment to 0.2 times the diameter D of the shank 3.

In FIG. 2 another embodiment of the invention is shown including a drill 11 with an axially extending working or cutting end 12 and an axially extending shank 13. Three angularly spaced axially extending grooves 14 are formed in the circumferentially extending surface of the shank 13. Each of the grooves is divided by means of a web 15 into a pair of axially extending groove sections 14a, 14b. As shown in FIG. 3, the groove sections each have a V-shaped transverse section. The V-shaped groove sections 14a, 14b have axially extending sides 16 and the sides enclose an angle $\alpha$ which in the illustrated embodiment is 100°.

The dimension A between the trailing end face 13a and the adjacent end of the axially extending groove 14 in the embodiment of FIG. 2 is 0.6 times the diameter D of the shank. The axial length B of the web and the axial length L of the groove sections 14a, 14b is the same and is 0.8 times the diameter D of the shank. The maximum depth T of the grooves 14 is 0.2 times the diameter D of the shank 13.

While specific embodiments of the invention have been shown and described in detail to illustrate the application of the inventive principles, it will be understood that the invention may be embodied otherwise without departing from such principles.

We claim:

1. A drill for use in a hand-held drilling device comprises an axially elongated shank arranged to be inserted into the hand-held device, said shank having an axially extending outside circumferential surface with a closed ended axially extending groove formed in the axially extending outside circumferential surface and said groove having ends extending transversely of the axially extending direction thereof, wherein the improvement comprises that said shank has a leading end, a trailing end, and a diameter D, the axially extending distance between the trailing end of said shank and the adjacent end of said axially extending groove is in the range of 0.3 to 1 times the diameter D of said shank, at least one web is located within said axially extending groove extending in the axially extending direction of said groove and also transversely thereof and divides said groove intermediate the ends thereof into axially extending groove sections, the surface of said web is located in the outside circumferential surface of said shank, each said groove section has a base spaced radially inwardly from the outside circumferential surface of said shank with said base extending parallel to the axis of said shank and each said groove section having opposite ends spaced apart in the axial direction with said groove section ends forming shoulders extending transversely of the axial direction.

2. A drill, as set forth in claim 1, wherein the axial length of said web is in the range of 0.4 to 1.1 times the diameter D of said shank, the axial length of each of said axially extending groove sections is in the range of 0.7 to 1.7 times the diameter D of said shank, the maximum depth of said axially extending groove sections is in the range of 0.1 to 0.3 times the diameter D of said shank.

3. A drill, as set forth in claim 1, wherein the axial length of said web is in the range of 0.4 to 1.1 times the diameter D of said shank.

4. A drill, as set forth in claim 1, wherein the axial length of said groove sections of said axially extending groove is in the range of 0.7 to 1.7 times the diameter D of said shank.

5. A drill, as set forth in claim 1, wherein the maximum depth of said axially extending groove inwardly from the outside circumferential surface thereof is in the range of 0.1 to 0.3 times the diameter D of the said shank.

6. A drill, as set forth in claim 1, wherein said axially extending groove sections are V-shaped in cross section transverse of the axial direction.

7. A drill, as set forth in claim 6, wherein the angle enclosed between the sides of said V-shaped axially extending groove sections is in the range of 50° to 130°.

8. A drill, as set forth in claim 7, wherein the angle enclosed between the sides of said V-shaped axially extending groove sections is in the range of 50° to 70°.

9. A drill, as set forth in claim 2, wherein said axially extending groove sections have a concave surface in section transverse to the axial direction.

10. A drill, as set forth in claim 2, wherein said axially extending groove sections are V-shaped in section transverse to the axial direction.

* * * * *